United States Patent

Sparka

(10) Patent No.: US 9,991,053 B2
(45) Date of Patent: Jun. 5, 2018

(54) POWER CAPACITOR

(75) Inventor: Hartmut Sparka, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1220 days.

(21) Appl. No.: 13/519,387

(22) PCT Filed: Nov. 5, 2010

(86) PCT No.: PCT/EP2010/066874
§ 371 (c)(1),
(2), (4) Date: Oct. 4, 2012

(87) PCT Pub. No.: WO2011/079993
PCT Pub. Date: Jul. 7, 2011

(65) Prior Publication Data
US 2013/0033913 A1     Feb. 7, 2013

(30) Foreign Application Priority Data

Dec. 29, 2009   (DE) .......................... 10 2009 055 376

(51) Int. Cl.
*H01G 4/30*     (2006.01)
*H01G 4/228*    (2006.01)
(Continued)

(52) U.S. Cl.
CPC .......... *H01G 4/228* (2013.01); *Y02T 10/7022* (2013.01)

(58) Field of Classification Search
CPC . H01G 4/38; H01G 4/228; H01G 4/30; H02B 1/21
(Continued)

(56) References Cited

U.S. PATENT DOCUMENTS 5,132,896 A * 7/1992 Nishizawa ............ H02M 7/003
  361/707
2005/0263845 A1* 12/2005 Saito ........................ H01G 2/10
  257/516

(Continued)

FOREIGN PATENT DOCUMENTS

DE         103 48 905        5/2005
DE     10 2008 001 570      11/2009
(Continued)

OTHER PUBLICATIONS

International Search Report, PCT International Application No. PCT/EP2010/066874, dated May 23, 2011.

*Primary Examiner* — Jenny L Wagner
*Assistant Examiner* — Arun Ramaswamy
(74) *Attorney, Agent, or Firm* — Norton Rose Fulbright US LLP; Gerard Messina

(57) ABSTRACT

A power capacitor, in particular a DC link capacitor, having a capacitor housing which has a first housing wall, in particular made of metal, which is galvanically connectable to a housing of an electronics unit, in particular a power electronics unit, and planar energizing units for energizing the power capacitor. A first subregion of a first energizing unit extends in an inner space of the housing adjacent to and at a distance from the first housing wall or from a different housing wall of the capacitor housing that is conductively connected to the first housing wall. A layer made of a dielectric material other than air is situated between the first subregion of the first energizing unit and this housing wall.

10 Claims, 2 Drawing Sheets

(51) Int. Cl.
  *H01G 4/38*   (2006.01)
  *H05K 7/04*   (2006.01)
  *H05K 7/02*   (2006.01)
  *H02B 1/01*   (2006.01)

(58) Field of Classification Search
  USPC .............. 361/306.1, 830, 624, 303, 811
  See application file for complete search history.

(56) References Cited

U.S. PATENT DOCUMENTS

| | | |
|---|---|---|
| 2006/0255448 A1 | 11/2006 | Nagase et al. |
| 2009/0040685 A1 | 2/2009 | Hiemer et al. |
| 2009/0059467 A1 | 3/2009 | Grimm et al. |
| 2009/0195957 A1 | 8/2009 | Grimm et al. |

FOREIGN PATENT DOCUMENTS

| | | |
|---|---|---|
| EP | 0 517 936 | 12/1992 |
| WO | WO 2006/116967 | 11/2006 |

\* cited by examiner

POWER CAPACITOR

FIELD OF THE INVENTION

The present invention relates to a power capacitor having an interference-suppression capacitor.

BACKGROUND INFORMATION

Pulse-controlled inverters having power capacitors in the form of direct-current (DC) link capacitors are used in a variety of applications, for example in automotive engineering. For the drive in hybrid or electric vehicles, electric machines in the form of polyphase machines are generally used which are operated in combination with pulse-controlled inverters, also often referred to as inverters. The electric machines are selectively operated in engine mode or generator mode. In engine mode, the electric machine generates a drive torque which, for use in a hybrid vehicle, assists an internal combustion engine, for example in an acceleration phase. In generator mode, the electric machine generates electrical energy which is stored in an energy store such as a battery, for example. A DC link capacitor is provided for stabilizing the battery voltage. The operating mode and power of the electric machine are adjusted via the pulse-controlled inverter.

Electromagnetic compatibility (EMC) measures must be taken to at least largely eliminate electromagnetic interferences caused by parasitic capacitances of the individual phase windings of the polyphase machine. For this purpose, interference-suppression capacitors in the form of separate interference-suppression capacitors are integrated into the pulse-controlled inverter by connecting them in each case between a terminal leading from the battery and the housing ground of a housing of the pulse-controlled inverter.

SUMMARY

In accordance with the present invention, a power capacitor, in particular a DC link capacitor, is provided which is mountable on a housing wall of an electronics unit, in particular a power electronics unit, having planar energizing units for energizing the power capacitor, a first subregion of a first energizing unit in the mounted state extending adjacent to and at a distance from the housing wall of the electronics unit, and a layer made of a dielectric material other than air being situated between the first subregion of the first energizing unit and the housing wall of the electronics unit.

The present invention also provides a power capacitor, in particular a DC link capacitor, having a capacitor housing which has a first housing wall, in particular made of metal, which is galvanically connectable to a housing of an electronics unit, in particular a power electronics unit, and planar energizing units for energizing the power capacitor, a first subregion of a first energizing unit extending in an inner space of the housing adjacent to and at a distance from the first housing wall, or from a different housing wall of the capacitor housing that is conductively connected to the first housing wall. In accordance with the present invention, a layer made of a dielectric material other than air is situated between the first subregion of the first energizing unit and this housing wall.

As the result of introducing a dielectric, which may be designed as a dielectric film or dielectric gel or dielectric resin, for example, interference-suppression capacitors, so-called Y capacitors, in the form of planar capacitors are formed between the subregion of the energizing unit facing the housing wall and the housing wall, via which harmful interference currents may discharge. If the power capacitor is open, i.e., not enclosed by a capacitor housing, on the side facing the housing of the electronics unit, the planar capacitor is formed directly between the energizing unit of the power capacitor and the housing wall of the electronics unit, and thus directly establishes a connection to the housing ground of the electronics unit. If the power capacitor is protected by a capacitor housing on the side facing the housing of the electronics unit, the electrical connection to the housing ground of the electronics unit is established in that the housing wall of the power capacitor is galvanically connected, i.e., connected in an electrically conductive manner, to the housing of the electronics unit. This is generally achieved by mounting the power capacitor directly on the electronics unit, which may be a pulse-controlled inverter, for example. The housings of the power capacitor and of the electronics unit are advantageously made of metal.

In accordance with the present invention, therefore, interference-suppression capacitors are integrated directly into the power capacitor by suitably introducing dielectric material into the power capacitor. In this way, additional costs for separate interference-suppression capacitors and mounting them to the busbars are spared. In addition, no extra installation space is required. Furthermore, the interference currents may discharge via the planar capacitors, formed inside the power capacitor, with much lower impedance than via the inductively acting connecting lines of separate interference-suppression capacitors. Since the thin connecting wires of conventional interference-suppression capacitors, which act as inductors, also impair the capacitive effect, the planar capacitors inside the power capacitor, in contrast, may be designed with a lower capacitance.

According to one specific embodiment of the present invention, the energizing units extend, generally overlapping and at a distance from one another, at least in a second subregion which may also correspond to the first subregion of the first energizing unit. A layer made of a dielectric material other than air is situated in the second subregion between the energizing units. A dielectric material which is suitable for high-frequency technology is advantageously used as the dielectric material.

The planar capacitor formed between the two energizing units with the aid of the dielectric material forms an X capacitor which is situated in parallel to the actual power capacitor which is formed by one or multiple capacitor elements and optionally other components. Depending on their function, power capacitors may absorb a large quantity of energy, but are "slow." By using a dielectric that is suitable for high-frequency technology, the additional X capacitor may be designed to be much "faster," so that higher frequencies may be short-circuited better, and the interference suppression effect may thus be improved.

According to another specific embodiment of the present invention, the first subregion of the first energizing unit is formed by a first busbar which is connected in an electrically conductive manner to a first planar contact bar which extends along a second housing wall of the capacitor housing, adjacent to and at a distance from same. A second energizing unit includes a second busbar which is connected in an electrically conductive manner to a planar second contact bar in a generally overlapping manner and at a distance from the first busbar, the planar second contact bar extending along a side of the capacitor housing situated opposite from the second housing wall. The contact bars are used for energizing at least one capacitor element of the power capacitor.

To increase the capacitive effect of the power capacitor, it is important to minimize the inductive spurious components to the greatest extent possible. This is achieved on the one hand by the planar design of the busbars. On the other hand, the mentioned specific embodiment contributes in further reducing the inductance of the power capacitor.

According to another specific embodiment, a layer made of a dielectric material other than air is situated between the first contact bar and the second housing wall. In this way, the planar capacitor acting as a Y capacitor may be "enlarged," and its capacitive effect may thus be enhanced.

Another specific embodiment of the present invention provides that one of the contact bars is electrically connected to a planar, additional busbar which extends along a third housing wall of the capacitor housing situated opposite from the first housing wall. A layer made of a dielectric material other than air is situated between the additional busbar and the third housing wall. In this manner as well, the planar capacitor acting as a Y capacitor may be "enlarged," and its capacitive effect may thus be enhanced.

Further features and advantages of specific embodiments of the present invention result from the following description, with reference to the figures.

DETAILED DESCRIPTION OF EXAMPLE EMBODIMENTS

Figure 1:
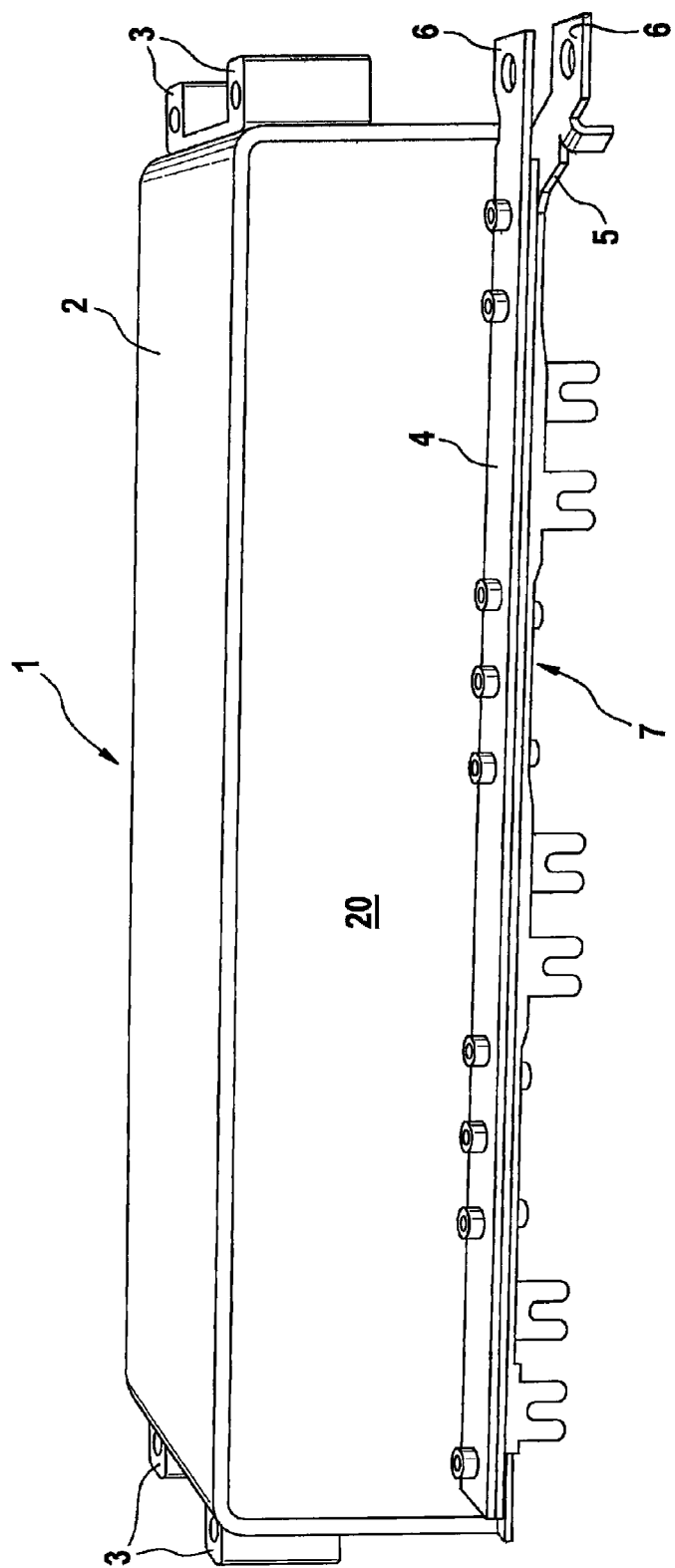
FIG. 1 shows a power capacitor in a perspective view.

Identical or functionally equivalent components are denoted by the same reference numerals in the figures.

FIG. 1 shows a power capacitor 1, which may be used as a DC link capacitor, having a capacitor housing 2. Multiple mounting lugs 3 are situated in the upper area of the side housing walls, with the aid of which the power capacitor may be mounted on a side wall 100 (see FIG. 2) of an electronics unit such as a pulse-controlled inverter, for example (see FIG. 3). The installation is carried out in such a way that a first housing wall, which for power capacitor 1 illustrated in FIG. 1 corresponds to the base plate, and which is not visible in FIG. 1 due to the illustration perspective selected, is galvanically connected, i.e., connected in an electrically conductive manner, to a housing 100 of the electronics unit. For this purpose, capacitor housing 2 and housing 100 of the electronics unit are advantageously designed as a metal housing, at least in some areas.

Two busbars 4 and 5 which are used to energize power capacitor 1 are led to power capacitor 1. The two busbars 4 and 5 are in each case electrically connectable via a mounting lug 6 to a positive or negative terminal, respectively, of an energy store (not illustrated in FIG. 1), for example a high-voltage battery of a motor vehicle electrical system. Busbars 4 and 5 have a planar design, largely overlapping and at a distance from one another, to allow the current to be distributed with the lowest possible inductance.

Figure 2:
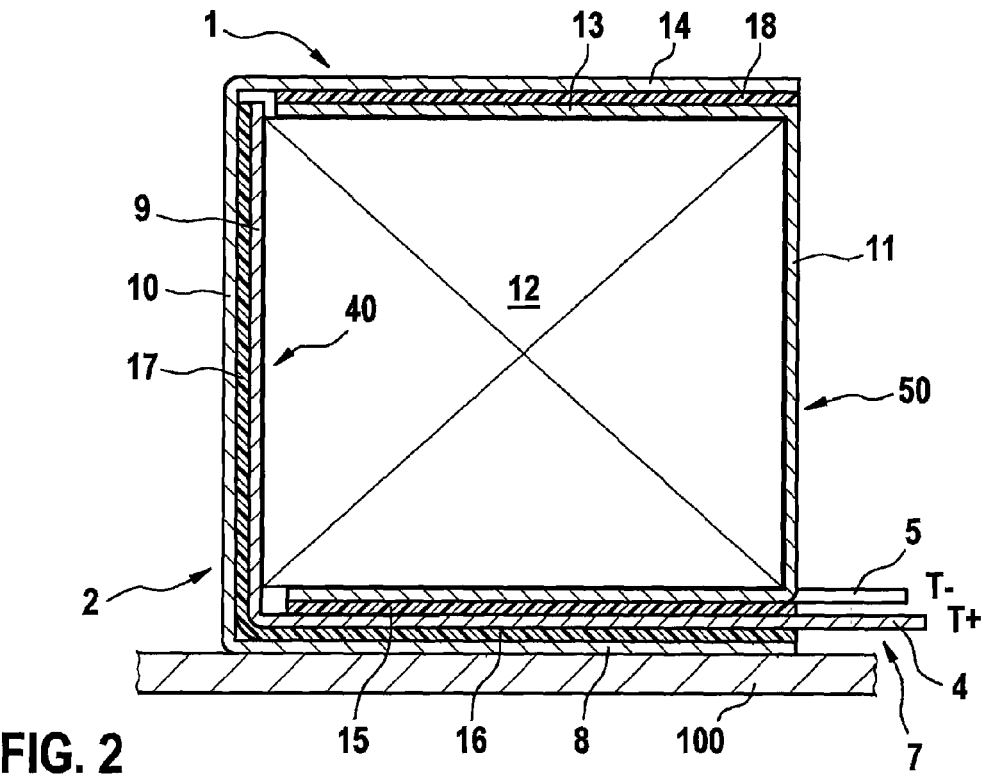
FIG. 2 shows one specific embodiment of a power capacitor according to the present invention in a schematic cross section.

As is apparent in FIG. 2, busbars 4 and 5 also continue planarly into the interior of capacitor housing 2, where they extend in parallel and at a distance from a first housing wall 8 of capacitor housing 2. In the specific embodiment of power capacitor 1 illustrated in FIGS. 1 and 2, capacitor housing 1 has a pot-shaped design. The open side of capacitor housing 2 illustrated on the right side of power capacitor 1 in FIG. 2 is subsequently closed off with the aid of a sealing compound during manufacture of the power capacitor. This housing wall 20 formed by a sealing compound is illustrated in the foreground in FIG. 1.

A first planar contact bar 9 is bent upwardly from a first busbar 4, which in the illustrated exemplary embodiment is to be connected to positive terminal T+ of an energy store (see FIG. 3), and then extends along a second housing wall 10 of capacitor housing 2 at a distance therefrom. A planar second contact bar 11 is bent upwardly from second busbar 5, which in the illustrated exemplary embodiment is to be connected to negative terminal T− of the energy store, and then extends along a side of capacitor housing 2 opposite from second housing wall 10. In the illustrated exemplary embodiment, second contact bar 11 extends on the side of capacitor housing 2, which is initially open and ultimately sealed. The two contact bars 9 and 11 are used to contact, with as little inductance as possible, one or multiple capacitor elements 12, which are merely schematically illustrated in the form of a block.

A planar, additional busbar 13 is bent to the left from second contact bar 11, and then extends along a third housing wall 14 of capacitor housing 2, situated opposite from first housing wall 8 and at a distance therefrom.

Contact bars 9 and 11 and additional busbar 13 do not necessarily have to be produced by bending; rather, as separate parts they may be fastened in an electrically conductive manner to the particular busbar 4 or 5 or to contact bar 11.

Busbar 4 together with contact bar 9 forms a first energizing unit 40 for energizing power capacitor 1. A second energizing unit 50 is formed by busbar 5, contact bar 11, and additional busbar 13. Individual bars 4, 5, 9, 11, and 13 each form subregions of corresponding energizing units 40 and 50.

A layer 15 and 16 made of a dielectric material other than air, for example silicone, is situated between first busbar 4 and second busbar 5 and between first busbar 4 and first housing wall 8, respectively. The dielectric material is introducible, for example, in the form of a dielectric film or a dielectric gel, or also in the form of a dielectric resin. The same or different dielectrics may be used.

As the result of introducing the dielectrics, Y capacitors Cy(T+) and Cy(T−) in the form of planar capacitors and connected in series are formed between busbars 4 and 5 on the one hand and first housing wall 8 on the other hand, via which harmful interference currents may discharge. For Y capacitor Cy(T+), only layer 16 acts as a dielectric, whereas Y capacitor Cy(T−) uses both layers 15 and 16 as a dielectric. The electrical connection to the housing ground of the electronics unit is subsequently established by galvanically connecting first housing wall 8 to housing 100 of the electronics unit. As an alternative to the specific embodiment illustrated in FIGS. 1 and 2, the area of power capacitor 1 facing housing wall 100 of the electronics unit may have an open design after power capacitor 1 is installed; i.e., does not have a capacitor housing wall 8. In this case, the planar capacitors which act as Y capacitors are formed directly between busbars 4 and 5 and housing wall 100 of the electronics unit, thus also resulting in a direct electrical connection to the housing ground of the electronics unit.

Optionally, layers 17 and 18, which are made of dielectric materials other than air, may also be situated between first contact bar 9 and second housing wall 10 and/or between additional busbar 13 and third housing wall 14, respectively. In this way, the planar capacitors may be "enlarged," so to speak, and the interference suppression effect may thus be enhanced.

As an alternative to the illustrated specific embodiment, for interference suppression it may be sufficient to implement only one of the two Y capacitors Cy(T−) or Cy(T+). It is also possible to not implement the Y capacitor(s) at the busbars, and to not extend same by optionally introducing further dielectric layers at the contact bars and additional busbars, but, rather, to implement the Y capacitor(s) only at one of the contact bars or the additional busbar. For application of the present invention, at least one Y capacitor should be formed between an energizing unit and the capacitor housing or the housing of the electronics unit by suitable provision of a dielectric layer. However, it should be noted that in the case of implementing the Y capacitor between the energizing unit and the capacitor housing, the corresponding housing wall of the capacitor housing has a galvanic, i.e., electrically conductive, connection to the housing ground of the electronics unit after the power capacitor is mounted on the electronics unit.

The two busbars 4 and 5 together with dielectric 15 situated in-between also form an X capacitor Cx, which is connected in parallel to the actual power capacitor formed by capacitor element(s) 12. Depending on their function, power capacitors may absorb a large quantity of energy, but are "slow." The present invention offers the option of using a dielectric that is suitable for high-frequency technology, at least for dielectric 15 situated between busbars 4 and 5. This results in a capacitor, connected in parallel to the actual power capacitor, which is much "faster" and may "short-circuit" higher frequencies much better, and which thus improves the interference suppression effect.

Figure 3:
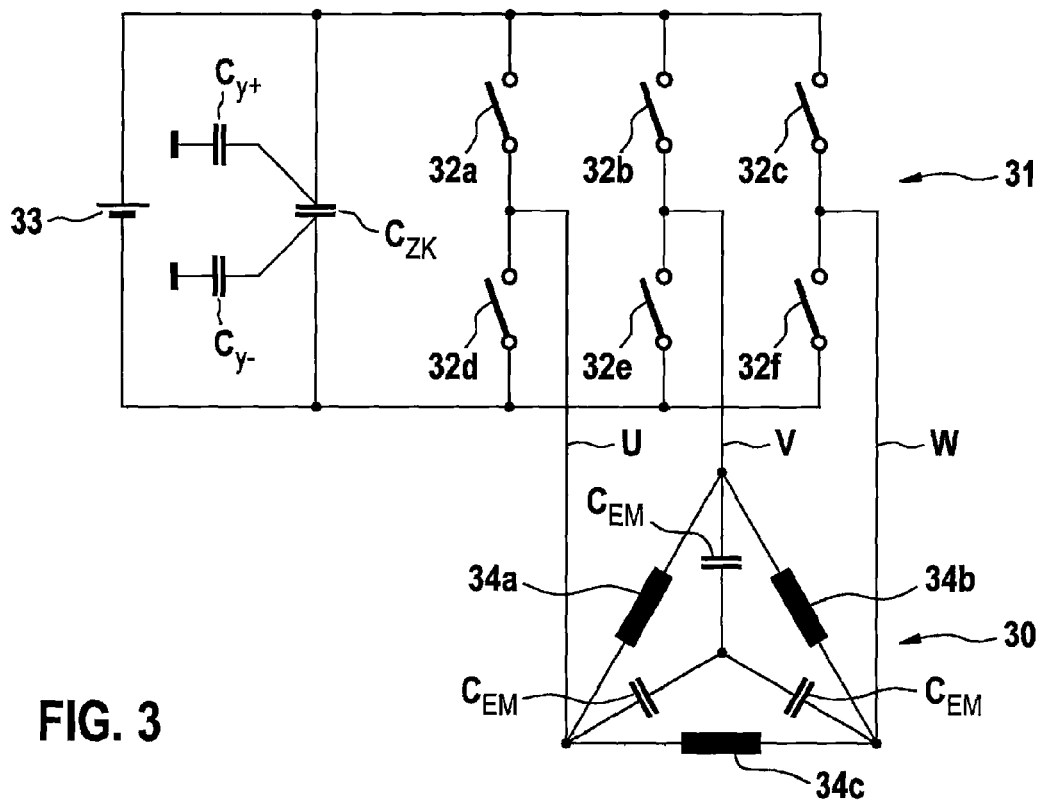
FIG. 3 shows a schematic circuit diagram of an electric machine having a pulse-controlled inverter and a DC link capacitor according to the present invention.

FIG. 3 shows a schematic illustration of an electric machine 30, to which an inverter in the form of a pulse-controlled inverter 31, as used in motor vehicles, for example, is connected. Pulse-controlled inverter 31 includes multiple power switching elements 32a through 32f, which are connected to individual phases U, V, W of electric machine 30 and which connect phases U, V, W to either a high supply potential (T+) or to a low supply potential (T−). Power switching elements 32a through 32c connected to high supply potential T+ are referred to as "high side switches," and power switching elements 32d through 32f connected to low supply potential T− are referred to as "low side switches." The power switching elements may be designed as insulated gate bipolar transistors (IGBTs) or as metal oxide semiconductor field-effect transistors (MOS-FETs).

Pulse-controlled inverter 31 determines the power and operating mode of electric machine 1, and is appropriately controlled by a control unit, not illustrated. Electric machine 30 may thus be selectively operated in engine mode or generator mode. In engine mode, the electric machine generates an additional drive torque which assists the internal combustion engine in an acceleration phase, for example. On the other hand, in generator mode, mechanical energy is converted into electrical energy and stored in an energy store, in the present case a battery 33. Battery 33 is connected to a power supply network, not illustrated, in a motor vehicle, whereby the battery may be designed as a high-voltage battery, and the power supply network may be designed, for example, as a high-voltage traction network in a hybrid vehicle.

A DC link capacitor $C_{ZK}$ is situated in parallel to pulse-controlled inverter 2, and is used generally for stabilizing the battery voltage, although according to the present invention it may also be used as an interference suppression element for improving the EMC.

In addition to schematically illustrated phase windings 34a through 34c, parasitic capacitors $C_{EM}$ are illustrated in the electric machine which are generally responsible for the interference currents, which in the embodiment of the DC link capacitor according to the present invention are to be returned in a targeted manner.

Y capacitors Cy+ and Cy− which are produced by an embodiment of DC link capacitor $C_{ZK}$ according to the present invention are illustrated in the form of corresponding equivalent circuit diagrams. Additional interference-suppression capacitors are not necessary.

The present invention has been explained for a practical embodiment of a power capacitor, with reference to the figures. However, it is pointed out that the present invention is of course also applicable to other specific embodiments of power capacitors, in particular with regard to the housing shape, course of the bars, and contacting of the capacitor elements. In the final analysis, it is important only that a dielectric material is introduced at least between an energizing unit and a housing wall, so that integrated interference-suppression capacitors are formed.

What is claimed is:

1. A DC link power capacitor mountable on a housing wall of a power electronics unit, comprising:
    planar energizing units to energize the power capacitor, a first subregion of a first one of the energizing units, in the mounted state, extending adjacent to and at a distance from the housing wall of the electronics unit; and
    a layer made of a dielectric material other than air situated between the first subregion of the first one of the energizing units and the housing wall of the electronics unit;
    wherein the energizing units extend such that two planar surfaces of the energizing units are overlapping and at a distance from one another for at least a majority of a length of the energizing units, and a layer made of the dielectric material other than air is situated in a second subregion between the planar surfaces of the energizing units, wherein, for at least the majority of the length of the energizing units, only the layer made of the dielectric material other than air is situated between the planar surfaces of the energizing units.

2. A DC link power capacitor, comprising:
    a capacitor housing which has a first housing wall made of metal which is galvanically connectable to a housing of a power electronics unit; and
    planar energizing units to energize the power capacitor, a first subregion of a first one of the energizing units extending in an inner space of the capacitor housing adjacent to and at a distance from one of the first housing wall, or from a different housing wall of the capacitor housing that is conductively connected to the first housing wall;
    wherein a layer made of a dielectric material other than air is situated between the first subregion of the first one of the energizing units and the one of the first housing wall or the different housing wall; and wherein the energizing units extend such that two planar surfaces of the energizing units are overlapping and at a distance from one another for at least a majority of a length of the energizing units, and a layer made of a dielectric material other than air is situated in a second subregion between the planar surfaces of the energizing units, wherein, for at least the majority of the length of the energizing units, only the layer made of the dielectric material other than air is situated between the planar surfaces of the energizing units.

3. The power capacitor as recited in claim 1, wherein the second subregion corresponds to the first subregion.

4. The power capacitor as recited in claim 2, wherein the first subregion of the first energizing unit is formed by a first busbar which is connected in an electrically conductive manner to a first planar contact bar which extends along a second housing wall of the capacitor housing, adjacent to and at a distance from same, and a second one of the energizing units includes a second busbar which is connected in an electrically conductive manner to a planar second contact bar in an overlapping manner and at a distance from the first busbar, the planar second contact bar extending along a side of the capacitor housing situated opposite from the second housing wall, and the contact bars are to energize at least one capacitor element.

5. The power capacitor as recited in claim 4, wherein a layer made of a dielectric material other than air is situated between the first contact bar and the second housing wall.

6. The power capacitor as recited in claim 4, wherein one of the contact bars is electrically connected to a planar, additional busbar which extends along a third housing wall of the capacitor housing situated opposite from the first housing wall, and a layer made of a dielectric material other than air is situated between the additional busbar and the third housing wall.

7. The power capacitor as recited in claim 2, wherein the layer made of dielectric material is one of a dielectric film, a dielectric gel, or a dielectric resin.

8. The power capacitor as recited in claim 2, wherein the dielectric material is suitable for high-frequency technology.

9. The power capacitor as recited in claim 2, wherein the capacitor housing has an open side, which is closed off using a sealing compound.

10. An electronic module, comprising:
a pulse-controlled inverter having a housing; and
a power capacitor mounted on the pulse-controlled inverter so that a galvanic connection results between adjoining housing walls, the power capacitor including a capacitor housing which has a first housing wall made of metal which is galvanically connected to the housing of the pulse-controlled inverter, the power capacitor further including a capacitor housing which has a first housing wall made of metal which is galvanically connectable to a housing of a power electronics unit, and planar energizing units to energize the power capacitor, a first subregion of a first one of the energizing units extending in an inner space of the capacitor housing adjacent to and at a distance from one of the first housing wall, or from a different housing wall of the capacitor housing that is conductively connected to the first housing wall, wherein a layer made of a dielectric material other than air is situated between the first subregion of the first one of the energizing units and the one of the first housing wall or the different housing wall, and wherein the energizing units extend such that two planar surfaces of the energizing units are overlapping and at a distance from one another for at least a majority of a length of the energizing units, and a layer made of a dielectric material other than air is situated in a second subregion between the planar surfaces of the energizing units, wherein, for at least the majority of the length of the energizing units, only the layer made of the dielectric material other than air is situated between the planar surfaces of the energizing units.

* * * * *